(12) United States Patent
Shime

(10) Patent No.: US 7,460,444 B2
(45) Date of Patent: Dec. 2, 2008

(54) OPTICAL DISK DRIVE AND METHOD FOR CONTROLLING SLED MOTOR WITHIN OPTICAL DISK DRIVE

(75) Inventor: Isao Shime, Yamagata (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 559 days.

(21) Appl. No.: 11/115,251

(22) Filed: Apr. 27, 2005

(65) Prior Publication Data
US 2005/0243678 A1 Nov. 3, 2005

(30) Foreign Application Priority Data
Apr. 28, 2004 (JP) ............... 2004-132676

(51) Int. Cl.
*G11B 7/00* (2006.01)
(52) U.S. Cl. .................... 369/44.11; 369/44.35
(58) Field of Classification Search .......... None
See application file for complete search history.

(56) References Cited

U.S. PATENT DOCUMENTS

| 2003/0012095 A1* | 1/2003 | Enokihara | 369/44.29 |
| 2004/0004911 A1* | 1/2004 | Yoon et al. | 369/30.17 |
| 2004/0257929 A1* | 12/2004 | Suzuki | 369/44.28 |
| 2005/0088925 A1* | 4/2005 | Sheu et al. | 369/44.28 |

FOREIGN PATENT DOCUMENTS

| JP | 5-189778 | 7/1993 |
| JP | 10-255285 | 9/1998 |
| JP | 10-255286 | 9/1998 |
| JP | 2001-167448 | 6/2001 |
| JP | 2001-167451 | 6/2001 |
| JP | 2002-183981 | 6/2002 |
| JP | 2003-116297 | 4/2003 |

OTHER PUBLICATIONS (Japanese Utility Model Application Laid-Open No. Sho 55-141373), no date.
(Japanese Utility Model Application Laid-Open No. Hei 02-128211), Dec. 23, 1990.

* cited by examiner

*Primary Examiner*—Wayne Young
*Assistant Examiner*—Lixi Chow
(74) *Attorney, Agent, or Firm*—McGinn IP Law Group, PLLC

(57) ABSTRACT

An optical disk drive is composed of comprising a tracking actuator, a sled motor, a sled filter developing an output corresponding to low frequency components of displacement of the tracking actuator, a pulse generating unit responsive to the output of the sled filter to develop drive pulses for driving the sled motor, and an pulse waveform adjusting unit designed to adjust waveforms of the drive pulses. The pulse waveform adjusting unit adjusts a waveform of relevant one of the drive pulses in response to the output of the sled filter and polarity of previous ones of the drive pulses.

7 Claims, 6 Drawing Sheets

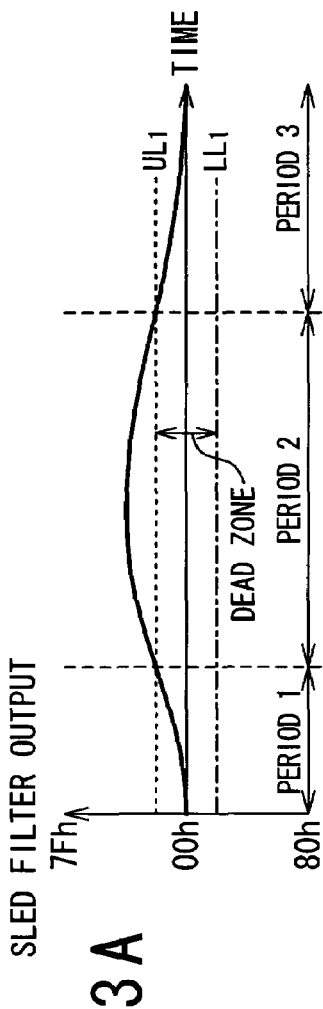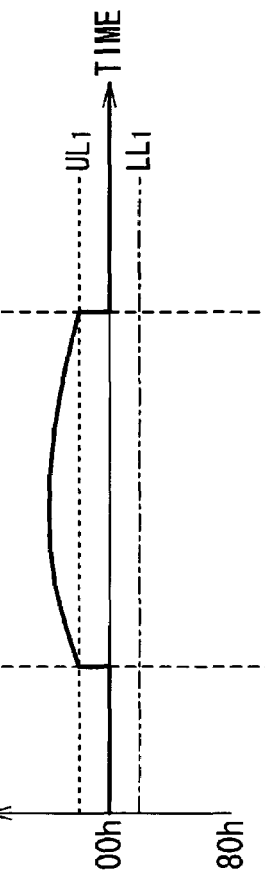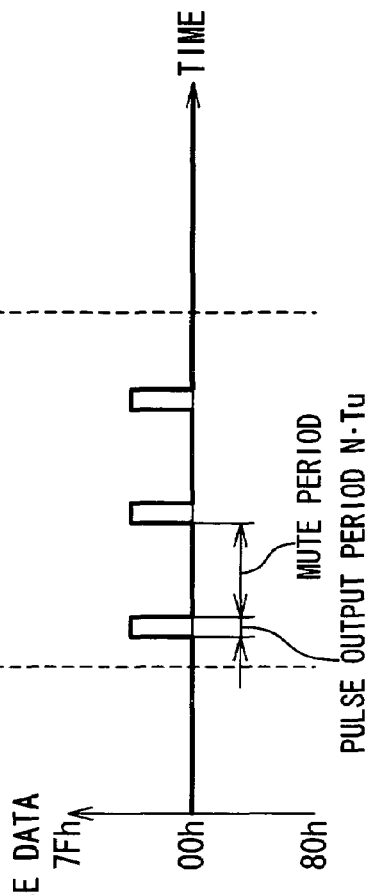

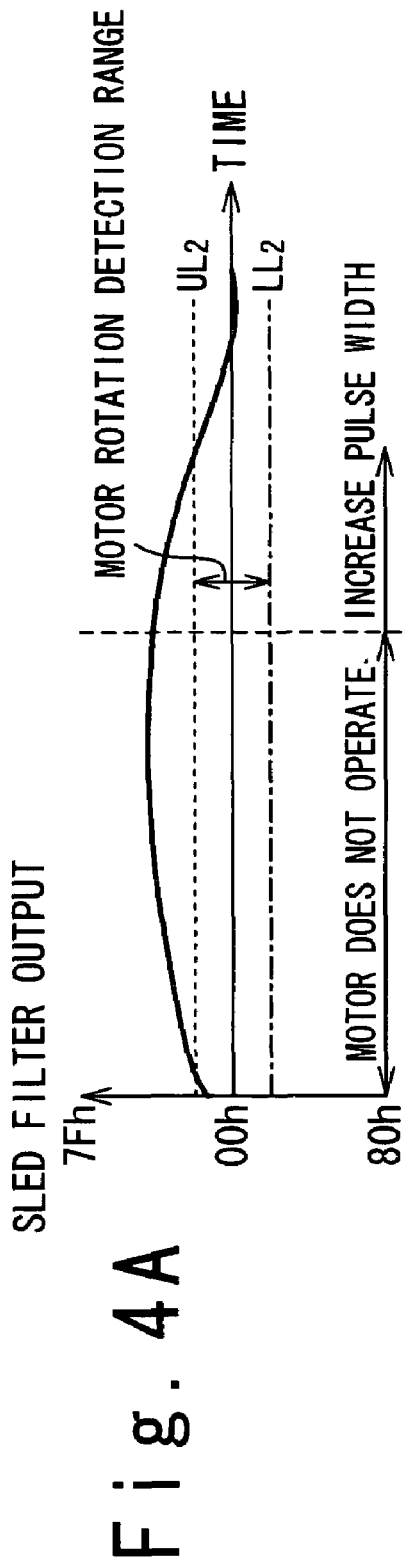
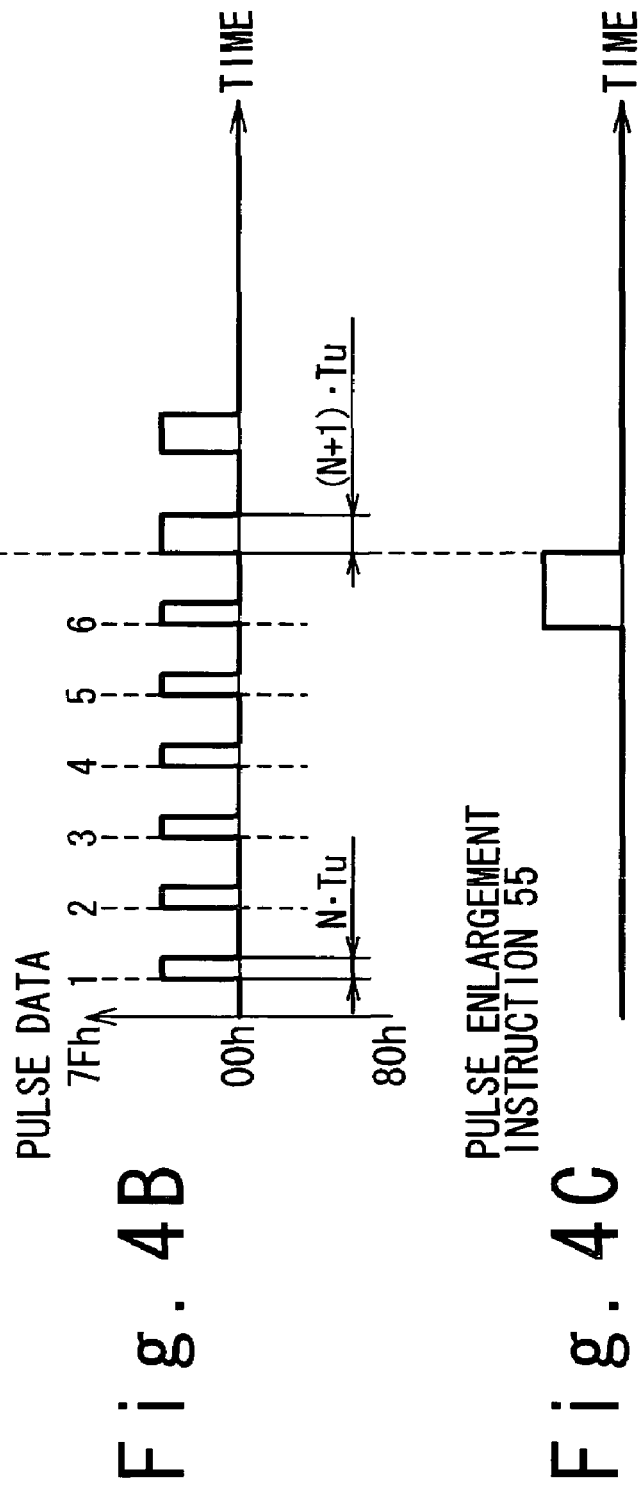

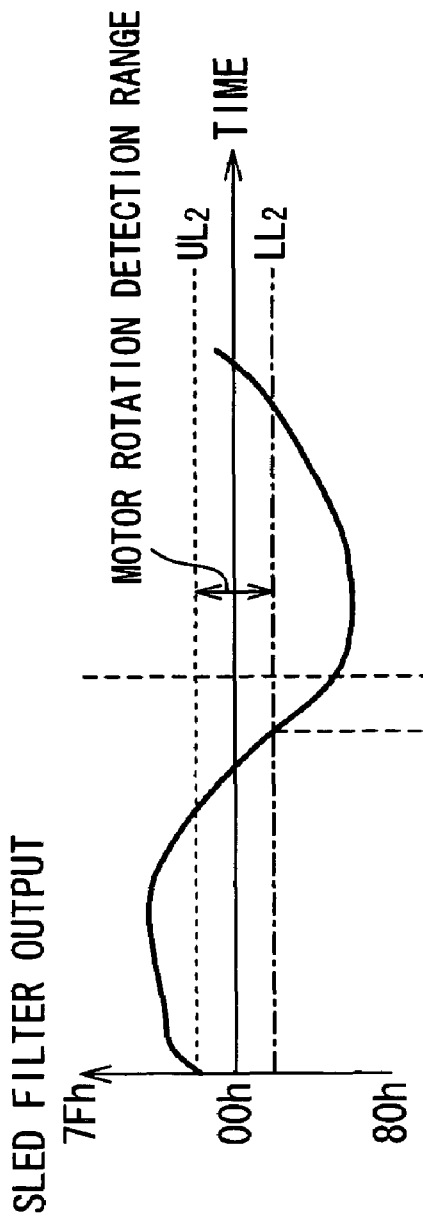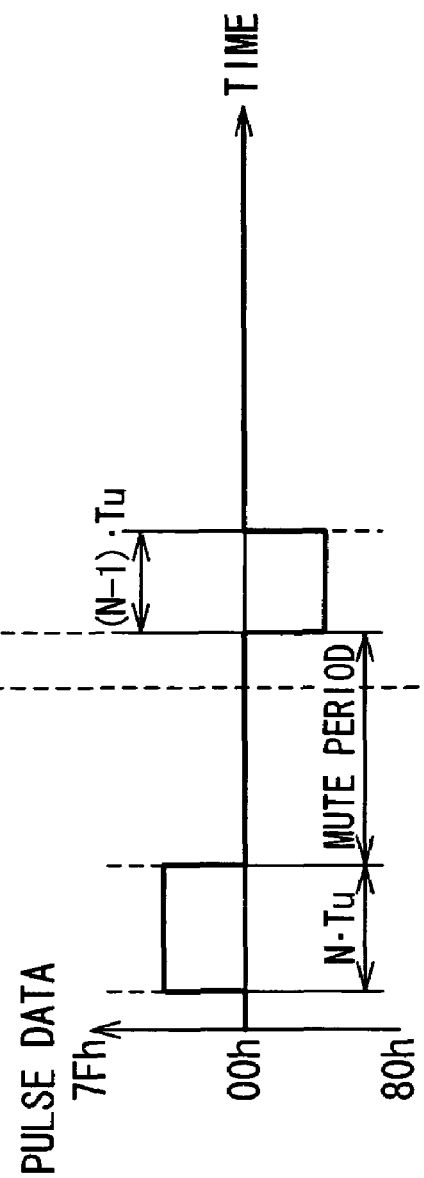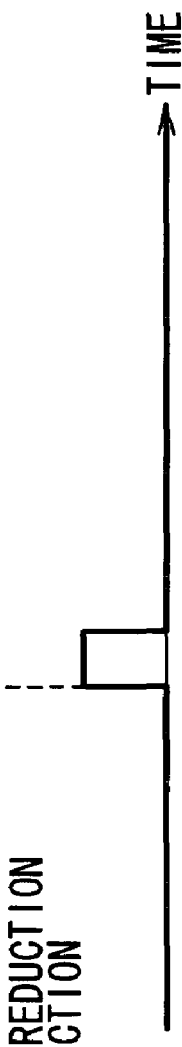

OPTICAL DISK DRIVE AND METHOD FOR CONTROLLING SLED MOTOR WITHIN OPTICAL DISK DRIVE

BACKGROUND OF THE INVENTION

1. Field of the Invention

The present invention relates to optical disk drives, particularly, to sled motor control for optical disk drives.

2. Description of the Related Art

In general, optical disk drives, such as Compact Disk (CD) drives and Digital Video Disk (DVD) drives, include a sled servo system (or a coarse actuator system) for achieving coarse tracking of the optical pickup. The sled servo system moves the optical pickup across the optical disk to make the optical pickup follow the spiral track on the optical disk. A typical sled servo system is composed of sled motor and a rotation-reciprocation conversion mechanism.

One of the typical methods for controlling the sled servo system is to generate a sled drive signal, used for driving the sled motor, from a tracking drive signal, used for driving the tracking actuator within the optical pickup. The tracking drive signal is typically generated through phase compensation of the tracking error signal. The low frequency components of the tracking drive signal is representative of the general displacement of the tracking actuator, and the sled drive signal is generated through phase compensation of the low frequency components of the tracking drive signal. The sled drive signal thus generated effectively achieves positioning the optical pickup so that the displacement of the tracking actuator is coarsely close to 0.

One requirement on the sled servo control is to reduce the duration required for "kick operation", that is, track jump operation for seeking the track. Japanese Laid-Open Patent Application No. P2001-167451A discloses that the sled motor control system is switched to open-loop control and the sled motor is then driven with an acceleration pulse having an increased pulse height and width. Japanese Laid-Open Patent Application No. P2001-167448A discloses that a kick pulse and a break pulse is superposed to the sled drive signal. Japanese Laid-Open Patent Application No. H10-255286A disclosed that the dead zone for driving the sled motor is eliminated during the kick operation to thereby rapidly move the optical pickup.

Another requirement is to stably control the sled motor. One cause of the instability in the sled motor control is that the optical pickup may be stuck due to the increased friction within the sled servo mechanism. Japanese Laid-Open Patent Application No. H10-255285A discloses that the sled servo system detects undesirable sticking of the optical pickup from the differential of the sled drive signal, and increases the sled drive signal so that the that the optical pickup gets rid of the sticking.

Another cause is that the mechanical load of the sled motor may be fluctuated. For example, the mechanism for converting the rotation of the sled motor into the reciprocation of the optical pickup may suffer from the change over time in the static friction therein.

Japanese Laid-Open Patent Application No. H05-189778A discloses an optical pickup feed device for achieving stable control of the sled servo system against the fluctuation of the mechanical load of the sled motor. This optical pickup feed device generates drive pulses in response to the low frequency components of the tracking actuator, and drives the sled motor by using the drive pulses, not by using continuous drive signals. The use of the drive pulses for driving the sled motor provides stable control over the fluctuation of the load, and is effective for improving the stability of the sled servo system. Additionally, Japanese Laid-Open Patent Application No. H05-189778A discloses that the pulse height and width of the drive pulses are modified when the low frequency components of the displacement of the tracking actuator is not changed, or the changed amount thereof is small.

Driving the sled motor with drive pulses requires appropriate adjustment of the waveform of the drive pulses, specifically, the pulse height and width of the drive pulses. The unsuitable waveform of the drive pulses may cause an undesired behavior of the optical pickup. An unsuitable waveform of the drive pulses may cause sticking of the optical pickup, or may cause undesirably large travel of the optical pickup.

One of factors for hindering the appropriate control of the pulse height and width of the drive pulses is the variation in the characteristics of the sled motor. Optical pickups experience different travel distances for the same pulse height and width due to the inevitable variation of the sled motor. At the extreme, a certain sled motor may be rotated and the other sled motor may not be rotated, for the same pulse height and width of the drive pulses. Particularly, the problem of the characteristics variation in the sled motor is serious when an inexpensive DC motor is used as the sled motor,

SUMMARY OF THE INVENTION

In an aspect of the present invention, an optical disk drive is composed of comprising a tracking actuator, a sled motor, a sled filter developing an output corresponding to low frequency components of displacement of the tracking actuator, a pulse generating unit responsive to the output of the sled filter to develop drive pulses for driving the sled motor, and an pulse waveform adjusting unit designed to adjust waveforms of the drive pulses. The pulse waveform adjusting unit adjusts a waveform of relevant one of the drive pulses in response to the output of the sled filter and polarities of previous ones of the drive pulses.

The optical disk drive, which is designed to adjust the waveform of relevant drive pulse in response to the polarities of the previous drive pulses, effectively provides appropriate control of the waveform of the relevant drive pulse.

BRIEF DESCRIPTION OF THE DRAWINGS

The above and other advantages and features of the present invention will be more apparent from the following description taken in conjunction with the accompanied drawings, in which:

FIGS. 3A to 3C are timing charts illustrating an exemplary operation of the optical disk drive for feeding drive pulses to a sled motor in accordance with the present invention;

FIGS. 4A to 4C are timing charts illustrating an exemplary control procedure for enlarging the pulse width of drive pulses;

FIGS. 5A to 5C are timing charts illustrating an exemplary control procedure for reducing the pulse width of drive pulses.

DESCRIPTION OF THE PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposed.

Optical Disk Drive Structure

Figure 1:
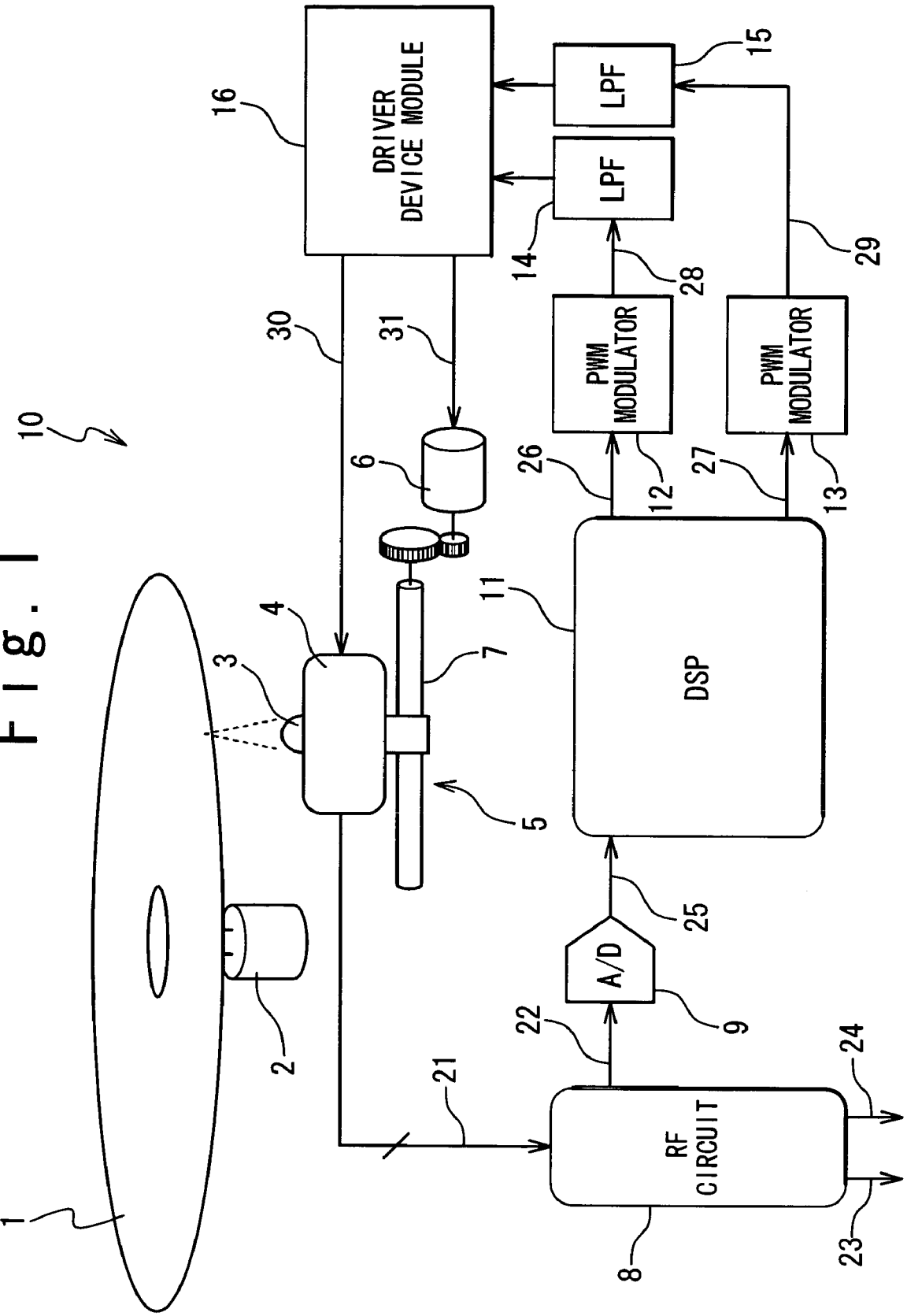
FIG. 1 is a block diagram illustrating an exemplary structure of an optical disk drive in accordance with the present invention.

FIG. 1 is a block diagram schematically illustrating an exemplary structure of an optical disk drive 10 in one embodiment of the present invention. The optical disk drive 10 is provided with a spindle motor 2 for rotating an optical disk 1, an optical pickup 3, a holder 4 for holding the optical pickup 3 and a feeding mechanism 5 for moving the holder 4 across the optical disk 1. The optical pickup 3 is provided with a laser diode, a photograph detector, an objective lens, a tracking actuator for moving the objective lens in the radial direction, and a focus coil for moving the objective lens in the vertical direction of the optical disk 1 (all not shown in FIG. 1). The feeding mechanism 5 includes a sled motor 6 and a ball screw 7. The screw shaft of the ball screw 7 is connected to the rotor of the sled motor 6, and the ball nut is connected to the holder 4. The feeding mechanism 5 is designed to move the holder 4 across the optical disk 1 when the screw shaft of the ball screw 7 is rotated by the sled motor 6. It should be noted that another mechanism may be used in place of the ball screw 7 for converting the rotation of the sled motor 6 into reciprocation of the holder 4; for example, a rack pinion mechanism may be used in place of the ball screw 7.

The optical disk drive 10 additionally includes a control-drive system for controlling and driving the tracking actuator, the focus coil, the spindle motor 2 and the sled motor 6. The control-drive system is provided with an RF circuitry 8, an A/D converter 9, a DSP 11, PWM modulator 12 and 13, low-pass filters (LPF) 14 and 15, and a driver device module 16.

The RF circuitry 8 receives photodetector signals (PD signals) 21 from the photodetector of the optical pickup 3 to generate a tracking error signal (TE signal) 22, a focus error signal (FE signal) 23, and an RF signal 24. The tracking error signal 22 is indicative of the error of the position of the spot of laser beam on the optical disk 1 in the radial direction, and the focus error signal 23 is indicative of the error in the vertical direction. The RF signal 24 corresponds to reproduction data recorded on the optical disk 1. Since the signal processing of the focus error signal 23 and the RF signal 24 is well-known in the art, no further description is given of the focus error signal 23 and the RF signal 24.

The A/D converter 9, the DSP 11, the PWM modulators 12 and 13, and the low-pass filters (LPF) 14 and 15 constitute a circuitry which implements processing of the tracking error signals 22, generated by the RF circuitry 8, to provide control signals for the driver device module 16. The A/D converter 9 converts the tracking error signals 22, which is an analog signal, into a digital tracking error signal 25. The DSP 11 is an arithmetic unit which generates tracking drive data (TD data) 26 and sled drive data (SD data) 27 from the digital tracking error signal 25. The TD data 26 indicates the level of the drive current to be supplied to the tracking actuator, having the data value corresponding to the displacement of the tracking actuator. The SD data 27 indicates the level of the drive current to be supplied to the sled motor 6. The PWM modulator 12 generates a TD_PWM signal 28 through pulse width modulation (PWM) from the TD data 26. Correspondingly, the PWM modulator 13 generates an SD_PWM signal 29 through pulse width modulation from the SD data 27. The LPFs 14 and 15 filter out the PWM carrier components from the TD_PWM signal 28 and the SD_PWM signal 29, respectively. The TD_PWM and SD_PWM signals 28 and 29 with the PWM carrier components filtered out are supplied to the driver device module 16.

The driver device module 16 generates a tracking actuator drive current 30 for driving the tracking actuator, and a sled motor drive current 31 for driving the sled motor 6. The driver device module 16 is responsive to the TD_PWM signal 28 received from the LPF 14 for generating the tracking actuator drive current 30, and is responsive to the SD_PWM signal 29 received from the LPF 15 for generating the sled motor drive current 31.

The waveform of the sled motor drive current 31 is changed depending on the operation of the optical disk drive 10. The sled motor drive current 31 is generated to be pulsatile when the optical disk drive 10 records or reproduces the data on the optical disk in normal operations; the waveform of the sled motor drive current 31 is not continuous. In other words, the sled motor 6 is driven with drive pulses. As described later, this is important for controlling the sled motor 6 in this embodiment. When the optical disk drive 10 performs a track jumping operation (or a kick operation), on the other hand, the sled motor drive current 31 is continuously developed, having a constant level.

DSP Structure and Operation

Figure 2:
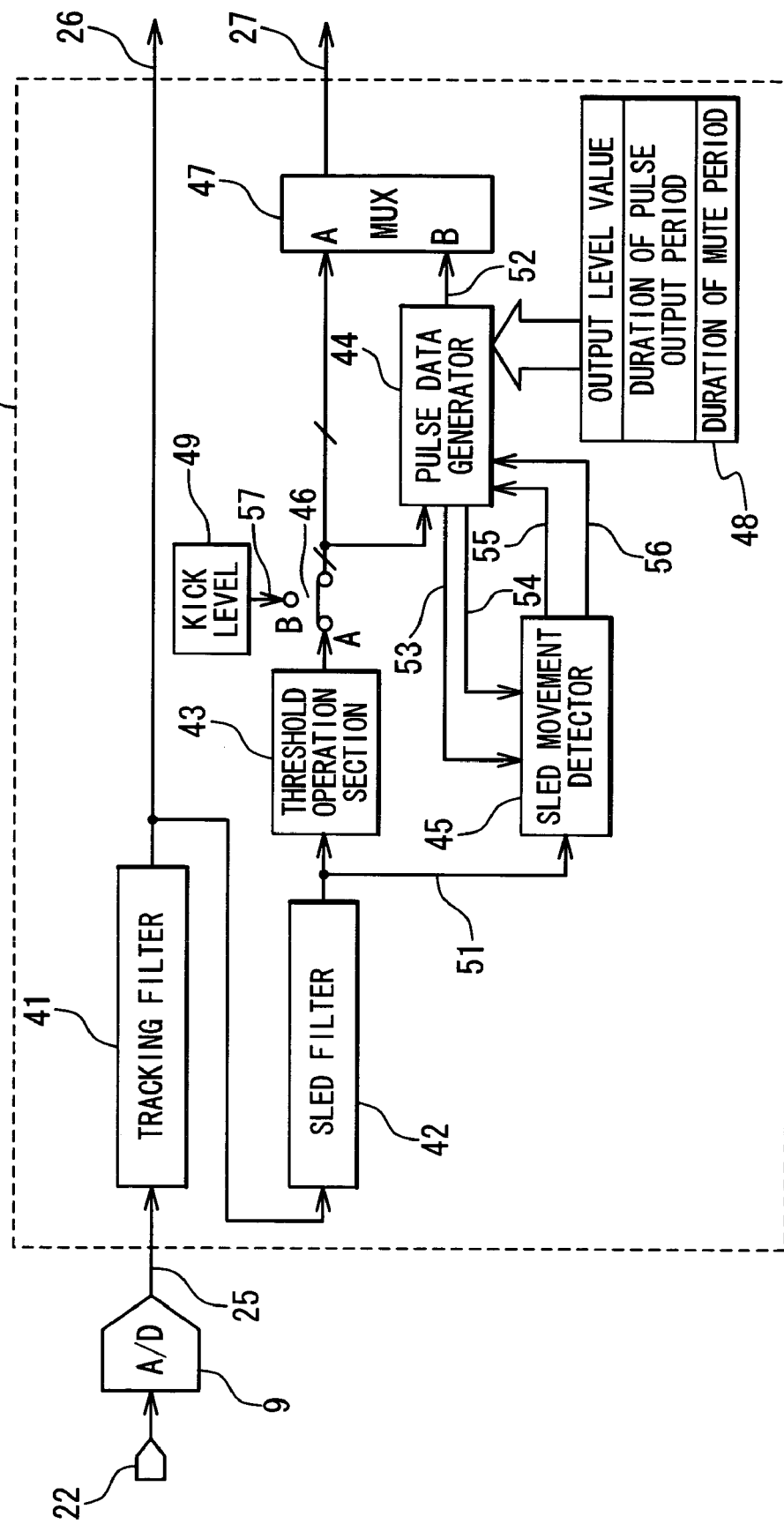
FIG. 2 is a block diagram illustrating an exemplary structure of a digital signal processor (DSP) within the optical disk drive in accordance with the present invention

FIG. 2 is a block diagram illustrating a block diagram of the DSP 11, designed to generate the TD data 26 and the SD data 27 from the digital tracking error signal 25. The TD data 26 is generated by a tracking filter 41. The tracking filter 41 provides phase compensation for the digital tracking error signal 25 to develop the TD data 26. As describe above, the value of the TD data 26 indicates the level of the tracking actuator drive current 30, i.e., the displacement of the tracking actuator.

The SD data 27 is generated by a sled filter 42, a threshold operation section 43, a pulse data generator 44, a sled movement detector 45, a switch module 46, a multiplexer 47, a pulse setting register 48, and a kick level register 49.

The sled filter 42 extracts low frequency components of the displacement of the tracking actuator from the TD data 26, and provides phase compensation for the low frequency components extracted to develop a sled filter output 51. Typically, the sled filter output 51 is 8 bits, and is expressed in the 2's complement notation. The sled filter output 51 thus obtained indicates the offset of the displacement of the tracking actuator. If the offset of the displacement of the tracking actuator is 0, the sled filter output 51 becomes a digital value of "00h". It should be noted that the symbol "h" indicates that the preceding number is expressed in the hexadecimal notation.

The threshold operation section 43 determines whether the sled filter output 51 is in a predetermined dead zone having an upper limit $UL_1$ and a lower limit $LL_1$ which are a set of values having different signs. The output value of the threshold operation section 43 depends on the determination result. When the sled filter output 51 is in the predetermined dead zone, the threshold operation section 43 outputs the digital value of "00h". When the sled filter output 51 is out of the dead zone, on the other hand, the threshold operation section 43 outputs the same value as the sled filter output 51.

The pulse data generator 44 is responsive to the output of the threshold operation section 43 for generating pulse data 52. The pulse data 52 is a candidate of the SD data 27, indicating the level of the sled motor drive current 31. The SD data 27 basically coincides with the pulse data 52; the value of the SD data 27 is different from that of the pulse data 52 only when the track jumping operation (the kick operation) is performed.

Specifically, the pulse data generator 44 generates the pulse data 52 as follows: when the output of the threshold operation section 43 is the digital value "00h" (that is, the sled filter output 51 is in the dead zone), the pulse data generator 44 sets the pulse data 52 to the digital value "00h".

When the output of the threshold operation section 43 is not the digital value "00h", on the other hand, the pulse data generator 44 develops the pulse data 52 (that is, the SD data 27) so that the sled motor drive current 31 is pulsatile. More specifically, the pulse data generator 44 generates the pulse data 52 so that pulse output periods and mute periods are alternately repeated; the pulse output periods designate the periods when the drive pulses are outputted, i.e., the periods when the pulse data 52 is set to a value other than the digital value "00h". The mute periods designate the periods when the sled motor drive current 31 is zero, i.e., the periods when the pulse data 52 is fixed to the digital value of "00h". The absolute value of the pulse data 52 during the pulse output period corresponds to the height of the drive pulses supplied to the sled motor 6, and the absolute value is referred to as the output level value, hereinafter. The sign of the pulse data 52 indicates the polarity of the drive pulses. The sign of the pulse data 52 during the pulse output period coincides with that of the output of the threshold operation section 43; when the output of the threshold operation section 43 is positive, the pulse data 52 is generated so as to have a positive value, and when the output of the threshold operation section 43 is negative, the pulse data 52 is generated so as to have a negative value.

The output level value, the duration of the pulse output periods, and the duration of the mute periods are initially stored in the pulse setting register 48. The duration of the pulse output periods is defined as $k \cdot T_U$ with $T_U$ being a predetermined unit time and k being a natural number. The output level value and the initial duration of the pulse output periods determined so that the sled motor 6 is rotated by only a minimum rotation angle.

The sled movement detector 45 detects the movement of the sled motor 6 from the sled filter output 51 received from the sled filter 42, a pulse output notification 53 and a pulse polarity notification 54 received from the pulse data generator 44, and adjusts the duration of the pulse output periods indicated in the pulse data 52 (and the SD data 27) in response to the movement of the sled motor 6. As is understood from the fact that the duration of the pulse output periods corresponds to the pulse width of the drive pulses of the sled motor drive current 31, the sled movement detector 45 provides pulse width control for the drive pulses within the sled motor drive current 31. The pulse output notification 53 is used for notifying the sled movement detector 45 of the fact that the drive pulses are generated, while the pulse polarity notification 54 notifies the sled movement detector 45 of the polarity of the drive pulses. That is, the sled movement detector 45 is responsive to the polarity of the drive pulses to detect the movement of the sled motor 6.

It is important to obtaining information on the polarity of the drive pulses for exactly detecting the movement of the sled motor 6. For example, the sled movement detector 45 can acknowledge the fact that the sled motor 6 is not rotated through successively providing drive pulses having the same polarity from the pulse polarity notification 54. Obtaining the information on the polarity of the drive pulses is also important for detecting the fact that the sled motor 6 is excessively rotated with a certain drive pulse; the excessive rotation of the sled motor 6 can be detected from the fact that the sled filter output 51 is largely changed to a value of the sign associated with the polarity opposite to the polarity of the drive pulses after the drive pulses are outputted. The sled movement detector 45, which monitors the sled filter output 51, the pulse output notification, 53 and the pulse polarity notification 54, can detect this phenomenon to acknowledge that the sled motor 6 is excessively rotated.

When judging that it is necessary to change the pulse width of the drive pulses from the movement of the sled motor 6, the sled movement detector 45 outputs a pulse enlargement instruction 55 or a pulse reduction instruction 56 and thereby indicates the pulse data generator 44 to adjust the pulse width of the drive pulses. Specifically, the sled movement detector 45 indicates the pulse data generator 44 to enlarge the pulse width of the drive pulses when the sled motor 6 is not rotated after a predetermined number of the drive pulses having the same polarity are successively outputted. This is achieved through developing the pulse enlargement instruction 55 and thereby indicating the pulse data generator 44 to increase the duration of the pulse output periods stored in the pulse setting register 48. When the sled motor 6 is excessively rotated by the drive pulses, on the other hand, the sled movement detector 45 indicates the pulse data generator 44 to reduce the pulse width of the drive pulses. This is achieved through developing the pulse reduction instruction 56 and thereby indicating the pulse data generator 44 to reduce the duration of the pulse output periods stored in the pulse setting register 48.

The switch module 46 and the multiplexer 47 are prepared for performing the track jumping operation within the optical disk drive 10. The switch module 46 and the multiplexer 47 selects the SD data 27 from a predetermined kick level data 57 stored in the kick level register 49, and the pulse data 52 generated by the pulse data generator 44. During the normal operation, the switch module 46 and the multiplexer 47 select the pulse data 52 generated by the pulse data generator 44 as the SD data 27. When the optical disk drive 10 performs the track jumping operation, on the other hand, the switch module 46 and the multiplexer 47 selects the kick level data 57 as the SD data. This results in that the sled motor drive current 31 is supplied to the sled motor 6, having a sufficiently large current level.

It should be noted that the above-described functions of the elements within the DSP 11 may be achieved by hardware, software, or the combination thereof.

Driving Pulse Control

Firstly, a description is given of an outline of the driving pulse control in this embodiment.

When detecting that the sled filter output 51 comes off the dead zone configured in the threshold operation section 43, the pulse data generator 44 starts to generate drive pulses having the same polarity at predetermined time intervals. The polarity of the drive pulses is dependent on the sign of the sled filter output 51. Generation of the drive pulses is achieved through setting the pulse data 52 to a value other than the digital value "00h" during the pulse output periods, and setting the pulse data 52 to the digital value "00h" during the mute periods. The absolute value of the pulse data 52 during the pulse output periods is configured to be the same as that of the output level value stored in the pulse setting register 48, and the sign of the pulse data 52 is configured to be the same as that of the sled filter output 51.

The sled movement detector 45 begins to monitor the movement of the sled motor 6 in response to the initiation of the output of the drive pulses. Specifically, the sled movement detector 45 monitors the pulse output notification 53 and pulse polarity notification 54 generated by the pulse data generator 44, and counts the number of the outputted drive pulses having the same polarity after the initiation of the output of the drive pulses.

The sled movement detector 45 determines that the sled motor 6 is not sufficiently rotated when the sled filter output 51 does not return inside of a predetermined range of values after a predetermined number of drive pulses having the same polarity are supplied to the sled motor 6, the predetermined range being defined as a range between a lower limit $LL_2$ and an upper limit $UL_2$; this predetermined range is referred to as the motor rotation detection range, hereinafter, because being used for detecting the fact that the sled filter output 51 is not sufficiently rotated. The lower limit $LL_2$ and the upper limit $UL_2$ are a set of values having different signs. When the sled motor 6 is not detected to be sufficiently rotated, the sled movement detector 45 transmits the pulse enlargement instruction 55 to the pulse data generator 44. In response to the pulse enlargement instruction 55, the pulse data generator 44 increases the duration of the pulse output periods by one unit time $T_U$. It should be noted that the output cycle time of the drive pulses may be also increased as the increase in the pulse width. In one embodiment, the mute period may be sustained constant after the pulse width is increased; this results in that the output cycle time of the drive pulses is also increased as the increase in the pulse width.

When the sled filter output 51 crosses the motor rotation detection range after one drive pulse is supplied to the sled motor 6 before the next drive pulse is supplied, on the other hand, the sled movement detector 45 determines that the sled motor 6 is excessively rotated. When the sled movement detector 45 determines that the sled motor 6 is excessively rotated, the sled movement detector 45 transmits the pulse reduction instruction 56 to the pulse data generator 44. In response to the pulse reduction instruction 56, the pulse data generator 44 reduces the duration of the pulse output periods by one unit time $T_U$. It should be noted that the output cycle time of the drive pulses may be decreased as the reduction in the pulse width. In one embodiment, the mute period may be sustained constant after the pulse width is decreased; this results in that the output cycle time of the drive pulses is decreased by the reduction in the pulse width.

Hereinafter, the specific example of the control of the drive pulses will be explained in detail.

FIGS. 3A to 3C are a set of timing charts illustrating an exemplary operation of generating drive pulses. In this embodiment, the tracking of the optical pickup 3 is initially correctly performed, with the displacement of the tracking actuator being approximately zero. This implies that the low frequency components of the tracking error signals 22 are approximately zero, and therefore the low frequency components of the TD data 26 generated from the tracking error signals 22 are also approximately zero. In response to the low frequency components of the TD data 26 being approximately zero, the sled filter output 51 is set to a value close to "00h". This results in that the output of the threshold operation section 43 is maintained to the digital value of "00h" in response to the sled filter output 51, and the pulse data 52 outputted by the pulse data generator 44 is also maintained to the digital value of "00h". In this situation, the drive pulses are not supplied to the sled motor 6.

Unsuccessful tracking of the optical pickup 3 causes the displacement of the tracking actuator, i.e., the level of the tracking error signal 22 to be increased, and this leads to the increase in the value of the TD data 26. With the increase in the TD data 26, the low frequency components of the displacement of the tracking actuator, extracted from the TD data 26, are also increased, and the sled filter output 51 is also increased (see Period 1 in FIGS. 3A to 3C).

When the sled filter output 51 exceeds the upper limit $UL_1$ of the dead zone, the threshold operation section 43 starts to select the sled filter output 51, and the output of the threshold operation section 43 starts to take certain positive values (see Period 2). In response to the output of the threshold operation section 43 being set to positive values other than the digital value "00h", the pulse data generator 44 operates to develop drive pulses having the positive polarity. In other words, the pulse data generator 44 begins to set the pulse data 52 to the output level value during the pulse output periods, and to set to the digital value "00h" during the mute periods. This allows the drive pulses having the positive polarity to be supplied to the sled motor 6.

When the holder 4 is driven by the sled motor 6 on the drive pulses so that the tracking of the optical pickup 3 is successfully achieved, the value of the TD data 26, i.e., the displacement of the tracking actuator approaches zero. In response to the value of the TD data 26 being close to the digital value "00h", the sled filter output 51 is decreased below the upper limit $UL_1$ (see Period 3). In response to the decrease of the sled filter output 51 below the upper limit $UL_1$, the output of the threshold operation section 43 is set to the digital value "00h", and the pulse data generator 44 stops the generation of the drive pulses.

When the sled motor 6 is not rotated after a predetermined number of the drive pulses are outputted, the pulse width of the drive pulses is enlarged. FIGS. 4A to 4C are a set of timing charts illustrating an exemplary control operation for enlarging the pulse width of the drive pulses. When the sled filter output 51 exceeds the upper limit $UL_1$ of the dead zone and positive drive pulses begins to be outputted, the sled movement detector 45 starts to monitor the pulse output notification 53 and the pulse polarity notification 54, and to count the number of the outputted positive drive pulses. When the sled filter output 51 does not return inside of the motor rotation detection range even after the predetermined number of the positive drive pulses are outputted (in this embodiment, after six positive drive pulses are outputted as shown in FIG. 4B), the sled movement detector 45 determines that the sled motor 6 is not sufficiently rotated, and develops the pulse enlargement instruction 55. In response to the pulse enlargement instruction 55, the pulse data generator 44 increases the pulse width of drive pulses outputted by one unit time $T_U$. When the original pulse width is $N \cdot T_U$, the pulse width of the drive pulses is increased up to $(N+1) \cdot T_U$.

When the sled motor 6 begins to be rotated with the pulse width increased, the sled filter output 51 begins to be decreased. When the sled filter output 51 is decreased below the upper limit $UL_2$ of the motor rotation detection range, the generation of the driving pulse is stopped. Hereinafter, the pulse width of the driving pulse is fixed to $(N+1) \cdot T_U$.

When the sled motor 6 is detected to be excessively rotated by the output of one driving pulse, the pulse width of the following drive pulses is decreased. FIGS. 5A to 5C are a set of timing charts illustrating an exemplary control operation for reducing the pulse width of the driving pulse. In response to the output of the driving pulse, the sled movement detector 45 begins to monitor the pulse output notification 53 and the pulse polarity notification 54. When the sled motor 6 is excessively rotated by the output of the positive driving pulse, the sled filter output 51 is rapidly decreased to cross the motor rotation detection range, that is, the sled filter output 51 is decreased from a value exceeding the upper limit $UL_2$ down to another value smaller than the lower limit $LL_2$, before the following driving pulse is outputted. When the sled movement detector 45 detects the fact that the sled filter output 51 is decreased below the lower limit $LL_2$ before the following driving pulse is outputted on the bases of the pulse output notification 53 and the pulse polarity notification 54, the sled movement detector 45 outputs the pulse reduction instruction 56. In response to the pulse enlargement instruction 55, the pulse data generator 44 decreases the pulse width of the following drive pulses by one unit time $T_U$. When the original pulse width is $N \cdot T_U$, the pulse width of the drive pulses is decreased down to the $(N-1) \cdot T_U$.

CONCLUSION

As explained above, the optical disk drive 10 in this embodiment is designed to control the pulse width of drive pulses in response to the movement of the sled motor 6. This effectively achieves the optimal control of the sled motor 6. Specifically, when the sled motor 6 is not rotated by supplying a predetermined number of drive pulses having the same polarity, the pulse width of the following drive pulses is increased. On the other hand, when the sled motor 6 is excessively rotated by one driving pulse, the pulse width of the following drive pulses is decreased. The excessive rotation of the sled motor 6 is detected from the sled filter output 51 and the pulse polarity notification 54.

In an alternative embodiment, the pulse height of drive pulses may be adjusted instead of the adjustment of the pulse width of drive pulses. When the sled motor 6 is not rotated by supplying a predetermined number of drive pulses having the same polarity, the pulse height of the following drive pulses is increased. When the sled motor 6 is excessively rotated by one driving pulse, the pulse height of the following drive pulses is decreased. Specifically, when detecting that the sled motor 6 is not rotated by supplying the drive pulses, the sled movement detector 45 develops the pulse enlargement instruction 55. In response to the pulse enlargement instruction 55, the pulse data generator 44 increases the output level value stored in the pulse setting register 48. Correspondingly, when detecting that the sled motor 6 is excessively rotated by supplying one driving pulse, the sled movement detector 45 develops the pulse reduction instruction 56. In response to the pulse reduction instruction 56, the pulse data generator 44 decreases the output level value stored in the pulse setting register 48.

In another alternative embodiment, both of the pulse width and height of the drive pulses may be adjusted in response to the movement of the sled motor 6. In this embodiment, in response to the pulse enlargement instruction 55, the pulse data generator 44 increases both of the output level value and the duration of the pulse output periods, which are both stored in the pulse setting register 48. When receiving the pulse reduction instruction 56, on the other hand, the pulse data generator 44 decreases both of the output level value and the duration of the pulse output periods.

In still another embodiment, trapezoidal pulses may be used as the drive pulses; in other words, the edges of the drive pulses may be slanted. The slant of the edges of the drive pulses makes the motion of the sled motor 6 smooth. In addition, the slant of the edges of the driving pulse effectively prevents the resonance in the optical pickup 3. The slant of the edge of the drive pulses prevents the sled motor 6 from starting the rotation sharply or stopping. In detail, the slant of the edges of the drive pulses prevents the generation of high-frequency vibration, and thereby effectively suppresses the generation of resonance within mechanisms having high resonance frequency, such as the optical pickup 3, which includes the tracking actuator.

Figure 6:
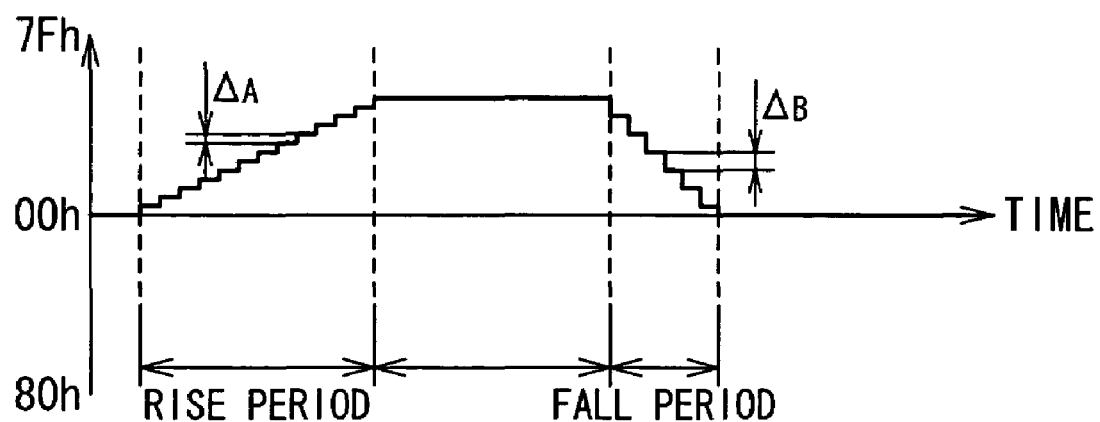
FIG. 6 is a timing chart illustrating change in values of pulse data for developing trapezoidal drive pulses.

FIG. 6 is a timing chart showing the change in the value of the pulse data 52 when the drive pulses are developed to be trapezoidal. When the drive pulses having positive polarity are outputted, the pulse data 52 is successively increased by $\Delta_A$ at the initial stage of the pulse output periods (or rise period) in synchronization with a system clock. When the pulse data 52 reaches the output level value stored in the pulse setting register 48, the pulse data 52 is maintained at the output level value for a while. At the final stage of the pulse output periods (or fall period), the pulse data 52 is successively decreased by $\Delta_B$ in synchronization with the system clock. This procedure results in that the edges of the drive pulses are slanted. Correspondingly, for developing drive pulses having the negative polarity, the pulse data 52 is successively decreased by $\Delta A$ at the initial stage of the pulse output periods, and is increased by $\Delta_B$ at the final stage of the pulse output periods.

It should be noted that both the edges of the driving pulse do not need to be slanted. In one embodiment, only the leading edges may be slanted; slanting the leading edges of the drive pulses is particularly effective for making the movement of the sled motor 6 smooth and for preventing the generation of the resonance in the optical pickup 3. In this case, the pulse data 52 is returned to the digital value "00h" from the output level value at the end of the pulse output periods within one cycle time of the system clock.

It is apparent that the present invention is not limited to the above-described embodiments, which may be modified and changed without departing from the scope of the invention.

What is claimed is:

1. An optical disk drive comprising:
   a tracking actuator;
   a sled motor;
   a sled filter developing an output corresponding to low frequency components of displacement of said tracking actuator;
   a pulse generating unit responsive to said output of said sled filter to develop drive pulses for driving said sled motor; and
   a pulse waveform adjusting unit designed to adjust waveforms of said drive pulses,
   wherein said pulse waveform adjusting unit adjusts a waveform of a relevant one of said drive pulses in response to said output of said sled filter and polarities of previous ones of said drive pulses.

2. The optical disk drive according to claim 1, wherein said pulse generator develops said drive pulses in response to said output of said sled filter being out of a predetermined dead zone.

3. The optical disk drive according to claim 2, wherein said pulse generator develops said previous drive pulses after a certain time when said output of said sled filter goes off said predetermined dead zone so that said previous drive pulses have a same polarity, and
   wherein said pulse waveform adjusting unit counts a number of said previous drive pulses developed with polarities thereof being same, and increases at least one of a pulse width and a pulse height of said relevant one of said drive pulses when said number of said previous drive pulses developed reaches a predetermined number before said output of said sled filter comes within a predetermined range.

4. The optical disk drive according to claim 2, wherein said pulse generating unit develops a latest one of said previous drive pulses to have a certain polarity, and wherein said pulse waveform adjusting unit reduces at least one of a pulse width and a pulse height of said relevant one of said drive pulses when said output of said sled filter crosses a predetermined range to reach a value having a sign corresponding to a polarity opposite to said certain polarity of said latest drive pulse.

5. The optical disk drive according to claim 2, wherein said drive pulses are each developed so that at least one of edges thereof is slanted.

6. An optical disk drive comprising:

an optical pickup including a tracking actuator driving an objective lens positioned opposed to an optical disk;

a sled motor designed to move said optical pickup across said optical disk; and a control system controlling said sled motor including:

an RF circuitry developing a tracking error signal in response to an output of said optical pickup;

a tracking filter developing a tracking drive data corresponding to a displacement of said tracking actuator from said tracking error signal;

a sled filter developing an output corresponding to low frequency components of said displacement of said tracking actuator;

a pulse generating unit generating drive pulses for driving said sled motor in response to said output of said sled filter being out of a predetermined dead zone; and a pulse waveform adjusting unit designed to adjust waveforms of said drive pulses, wherein said pulse waveform adjusting unit adjusts a waveform of a relevant one of said drive pulses in response to said output of said sled filter and polarity of previous ones of said drive pulses.

7. A method for controlling a sled motor comprising:

developing an output data corresponding to low frequency components of displacement of a tracking actuator; and generating drive pulses for driving a sled motor in response to an output of a sled filter being out of a predetermined dead zone, wherein a waveform of a relevant one of said drive pulses is adjusted in response to said output of said sled filter and polarity of previous ones of said drive pulses.

* * * * *